(12) United States Patent
Liao et al.

(10) Patent No.: US 11,504,691 B2
(45) Date of Patent: Nov. 22, 2022

(54) MICROWAVE-BASED THERMAL COUPLING CHEMICAL LOOPING GASIFICATION METHOD EMPLOYING TWO SOURCES, AND DEVICE FOR SAME

(71) Applicant: South China University of Technology, Guangzhou (CN)

(72) Inventors: Yanfen Liao, Guangzhou (CN); Yan Lin, Guangzhou (CN); Zhaosheng Yu, Guangzhou (CN); Shiwen Fang, Guangzhou (CN); Yousheng Lin, Guangzhou (CN); Yunlong Fan, Guangzhou (CN); Minquan Dai, Guangzhou (CN); Zhijie Chen, Guangzhou (CN); Xiaoqian Ma, Guangzhou (CN)

(73) Assignee: South China University of Technology

( * ) Notice: Subject to any disclaimer, the term of this patent is extended or adjusted under 35 U.S.C. 154(b) by 234 days.

(21) Appl. No.: 16/613,920

(22) PCT Filed: Dec. 7, 2017

(86) PCT No.: PCT/CN2017/115017
§ 371 (c)(1),
(2) Date: Nov. 15, 2019

(87) PCT Pub. No.: WO2018/209926
PCT Pub. Date: Nov. 22, 2018

(65) Prior Publication Data
US 2022/0001351 A1 Jan. 6, 2022

(30) Foreign Application Priority Data
May 18, 2017 (CN) .......................... 201710352769.3

(51) Int. Cl.
*B01J 19/12* (2006.01)
*H05B 6/80* (2006.01)

(52) U.S. Cl.
CPC ............ *B01J 19/126* (2013.01); *H05B 6/806* (2013.01); *B01J 2219/00058* (2013.01);
(Continued)

(58) Field of Classification Search
CPC ............ B01J 19/126; B01J 2219/00058; B01J 2219/1206; B01J 8/087; B01J 8/10;
(Continued)

(56) References Cited

U.S. PATENT DOCUMENTS

| 2010/0258429 | A1* | 10/2010 | Ugolin | B01J 19/2405 204/157.43 |
| 2014/0161680 | A1* | 6/2014 | Kantor | C10B 53/07 210/523 |
| 2017/0245740 | A1* | 8/2017 | Krimsky | A61B 1/00133 |

FOREIGN PATENT DOCUMENTS

| CN | 105524662 A | 4/2016 |
| CN | 107051350 A | 8/2017 |
| JP | 2011178859 A | 9/2011 |

OTHER PUBLICATIONS

Hu et al, "A study on experimental characteristic of microwave-assisted pyrolysis of microalgae", Bioresource Technology, 107(2012), 487-493 (Year: 2012).*

* cited by examiner

*Primary Examiner* — Xiuyu Tai
(74) *Attorney, Agent, or Firm* — The Webb Law Firm

(57) ABSTRACT

A microwave-based thermal coupling chemical looping gasification method and device. The device includes: a microwave radiation cavity; a loading recess of a microwave absorbing material; and a quartz pipe reaction cavity between the microwave radiation cavity and the loading recess of a microwave absorbing material. A microwave
(Continued)

generator consisting of magnetrons is provided at a central portion of the microwave radiation cavity and below the loading recess. An infrared temperature-measuring probe group is arranged at two ends of the magnetrons. Two ends of the microwave radiation cavity are connected to a first and second three-way valves, in communication with the ambient atmosphere and a protection gas charging device. A protection gas cooling device and a protection gas circulating fan are sequentially connected in series on a pipeline between the valves.

6 Claims, 1 Drawing Sheet

(52) U.S. Cl.
CPC ................ *B01J 2219/00087* (2013.01); *B01J 2219/00162* (2013.01); *B01J 2219/00175* (2013.01); *B01J 2219/1206* (2013.01)

(58) Field of Classification Search
CPC ...... B01J 19/087; B01J 19/088; B01J 19/127; B01J 19/20; B01J 2208/00389; B01J 2208/00415; B01J 2219/083; B01J 2219/0809; B01J 2219/0822; B01J 2219/0839; B01J 2219/0841; B01J 2219/0871; B01J 2219/00087; B01J 2219/00162; B01J 2219/00175; H05B 6/806; C22B 21/02; C22B 21/0053; C01K 3/001; C01B 7/10; C01B 19/00; C01B 23/00; C10L 9/083; C10L 2290/02; C10L 2290/06

See application file for complete search history.

MICROWAVE-BASED THERMAL COUPLING CHEMICAL LOOPING GASIFICATION METHOD EMPLOYING TWO SOURCES, AND DEVICE FOR SAME

CROSS-REFERENCE TO RELATED APPLICATIONS

This application is the United States national phase of International Application No. PCT/CN2017/115017 filed Dec. 7, 2017, and claims priority to Chinese Patent Application No. 201710352769.3 filed May 18, 2017, the disclosures of each of which are hereby incorporated by reference in their entireties.

FIELD OF THE INVENTION

The present invention relates to a biomass chemical looping gasification experimental device, in particular to a microwave-based thermal coupling chemical looping gasification method employing two sources, and a device for the same.

BACKGROUND OF THE INVENTION

Among many biomass energy utilization technologies, Chemical Looping Gasification (CLG), as a novel gasification technology, provides the oxygen element required for the gasification reaction of fuel by replacing the medium of the conventional gasification reaction with the lattice oxygen in the oxygen carrier, and obtains syngas with $H_2$ and CO as main components by controlling the calorific value ratio of the lattice oxygen to the fuel.

Internationally, research on the biomass chemical looping gasification mostly relies on the research experience of the coal chemical looping gasification. In order to obtain syngas with a higher calorific value, the gasification conditions are more stringent, and high temperature and high pressure are usually required, which has high requirements for the energy input of the gasification reaction. How to achieve an efficient and rapid gasification reaction device is a problem faced by industrial applications of the chemical looping gasification technology.

Microwave has obvious characteristics such as short wavelength (1 m to 1 mm), high frequency (300 MHZ to 300 GHZ), and quantum property. Microwave technology is widely used in radar, navigation, multi-channel communication, remote sensing, television, and the like. Since the 1960s, microwave heating technology has been gradually applied to physical processing processes such as those for paper, wood, and resin extrusion. In recent years, microwave heating technology has been introduced in the production process of microwave molybdenum industry, which not only can effectively improve the reaction conversion rate and selectivity, but also shows many advantages such as energy saving and environmental protection. Therefore, the microwave heating technology has been widely valued by people as one of the means to achieve green technology.

According to the previous research on biomass microwave pyrolysis/gasification, microwave heating cannot effectively achieve direct heating of biomass due to the weak microwave absorption characteristics of most biomass itself. It is common practice to incorporate a microwave absorbing material into the biomass to increase the microwave heating efficiency. However, this in turn makes the reactants too complicated, making it difficult to effectively control the reaction process and reaction products.

In order to solve the technical problems with the biomass chemical looping gasification technology, the present invention provides a biomass chemical looping gasification experimental device and a method of using the same, and in particular relates to a microwave-based thermal coupling chemical looping gasification method employing two sources, and a device for the same.

CONTENTS OF THE INVENTION

In order to overcome the above disadvantages and shortcomings of the prior art, an object of the present invention is to provide a microwave-based thermal coupling chemical looping gasification method employing two sources, and a device for the same. The present invention is to solve the technical problems that the conventional practice is easy to cause the reactants to be too complicated and it is difficult to effectively control the reaction process and reaction products.

The present invention is realized through the following technical solution:

A microwave-based thermal coupling chemical looping gasification device employing two sources comprises the following components:

a microwave radiation cavity 13;

a loading recess 10 of a microwave absorbing material filled with the microwave absorbing material;

a quartz pipe reaction cavity 9 between the microwave radiation cavity 13 and the loading recess 10 of the microwave absorbing material; the quartz pipe reaction cavity 9 is driven to rotate by a motor 11;

a microwave generator consisting of magnetrons 7 is provided at a central portion of the microwave radiation cavity 13 and below the loading recess 10 of the microwave absorbing material at a corresponding location; an infrared temperature-measuring probe group 8 is arranged at two ends of the magnetrons 7;

two ends of the microwave radiation cavity 13 are connected to a first three-way valve 4-1 and a second three-way valve 4-2, respectively;

the first three-way valve 4-1 has a port A in communication with the ambient atmosphere; the second three-way valve 4-2 has a port B in communication with a protection gas charging device 1 for the microwave radiation cavity; the second three-way valve 4-2 has a port A in communication with a port B of the first three-way valve 4-1 via a pipeline; a protection gas cooling device 2 and a protection gas circulating fan 3 are sequentially connected in series on the pipeline; and a microwave suppressor 6 is disposed at each of the two ports of the quartz pipe reaction cavity 9.

The first three-way valve 4-1 is turned to the left, such that the microwave radiation cavity 13 is in communication with the ambient atmosphere.

The second three-way valve 4-2 is turned to the right, such that the protection gas charging device 1 for the microwave radiation cavity is in communication with the microwave radiation cavity 13 to get the microwave radiation cavity 13 charged.

The second three-way valve 4-2 is turned to the left, and the first three-way valve 4-1 is turned to the right, such that the microwave radiation cavity 13, the protection gas circulating fan 3 and the protection gas cooling device 2 form a closed loop.

A gas pressure and oxygen concentration detector 5 is disposed on the connecting pipeline between the first three-way valve 4-1 and the microwave radiation cavity 13.

The microwave radiation cavity 13 is also provided with a radiation cavity lock 12.

A microwave-based thermal coupling chemical looping gasification method employing two sources comprises the following steps:

Step 1: materials are placed in the middle of the quartz pipe reaction cavity 9, and the left and right ends of the quartz pipe reaction cavity 9 are made in communication with an inert carrier gas and a product collection device, respectively; first the air in the quartz pipe reaction cavity 9 is removed by pre-purging, and then the carrier gas supply is maintained throughout the gasification process until the end of the reaction;

Step 2: the first three-way valve 4-1 is turned to the left to make the microwave radiation cavity 13 in communication with the ambient atmosphere, and meanwhile the second three-way valve 4-2 is turned to the right to make the microwave radiation cavity 13 in communication with the protection gas charging device 1 for the microwave radiation cavity; the microwave radiation cavity 13 is charged, and attention is paid to the oxygen level and the internal protection gas pressure displayed by the gas pressure and oxygen concentration detector 5; when the oxygen concentration is less than 0.1%, the second three-way valve 4-2 is turned to the left and the first three-way valve 4-1 is turned to the right, such that the microwave radiation cavity 13, the gas pressure and oxygen concentration detector 5, the protection gas circulating fan 3 and the protection gas cooling device 2 form a closed loop; the protection gas circulating fan 3 and the protection gas cooling device 2 are started to circulate the inert gas in the closed loop; it is necessary to maintain a positive pressure of the microwave radiation cavity 13 throughout the reaction process; if the gas pressure and oxygen concentration detector 5 shows that the pressure is less than 1 atm, the protection gas charging device 1 for the microwave radiation cavity is started in time to supplement the protection gas;

Step 3: the motor 11 is started to maintain the quartz pipe reaction cavity 9 in a slow rotation state; then the magnetron 7 is started, with its input power and frequency controlled through a computer; the surface temperature of the materials is monitored by an infrared temperature probe group 8, and the temperature data are collected and stored by a computer; the temperature in the loading recess 10 of the microwave absorbing material is monitored by a patch thermocouple, and the temperature data are also collected and stored by a computer;

at the end of the reaction, the magnetron 7 is turned off, the positive pressure of the microwave radiation cavity 13 is released, the radiation cavity lock 12 is opened, and the quartz pipe reaction cavity 9 is taken out for cleaning.

The present invention has the following advantages and effects compared with the prior art:

Compared with the conventional electric furnace heating, the thermal coupling chemical looping gasification device employing two sources not only contains the heating method similar to the conventional electric furnace (the conduction, convection and surface radiation of the microwave absorbing material), but also includes the microwave electromagnetic radiator heating. This not only ensures the temperature conditions required for biomass gasification, but also introduces the effect of microwave radiation energy, making the entire gasification process more stable, more efficient, faster and safer. The advantages and effects of the present invention are specifically as follows:

(1) The conversion of microwave into heat energy is more efficient and direct, and thus the input electric energy is greatly reduced under the same gasification conditions;

(2) a stable high temperature is achieved through microwave absorption by the microwave absorbing material, which ensures the stable high temperature needed in the gasification process;

(3) microwave radiation can be directly irradiated on the materials to achieve bulk heating, which is combined with the stable high temperature heating achieved by the microwave absorbing material to form a thermal coupling enhanced heating method employing two sources;

(4) the reaction cavity rotates continuously throughout the reaction process to ensure sufficient mixing and heating of the materials and also alleviate the sintering of the oxygen carrier and the biomass ash generated during the gasification process;

(5) there are many problems with conventional thermocouple and single infrared temperature measurement; non-contact temperature measurement made with the infrared temperature-measuring probe group can avoid the influence of the temperature-measuring probe on the magnetic field and effectively achieve the large temperature-measuring range from low temperature to high temperature, reducing the complexity of equipment manufacturing;

(6) the microwave shielding net around the motor can intercept the leaked microwave, which is combined with a microwave suppressor to form a double-layer protection against microwave leakage, effectively preventing microwave leakage; and (7) the device is easy to disassemble and clean, and the gases and liquids involved in the operation are non-toxic and harmless, such that the whole reaction process is safe, stable, and environmentally friendly.

In summary, the technical means of the present invention are simple, easy to implement, efficient, rapid, economical, energy-saving, safe, stable and environmentally friendly, and can be widely applied to experimental research of laboratory biomass chemical looping gasification, having the potential to be further promoted in industrial applications.

DETAILED DESCRIPTION OF THE EMBODIMENTS

The present invention will be further described below in detail with reference to specific examples.

EXAMPLE

Figure 1:
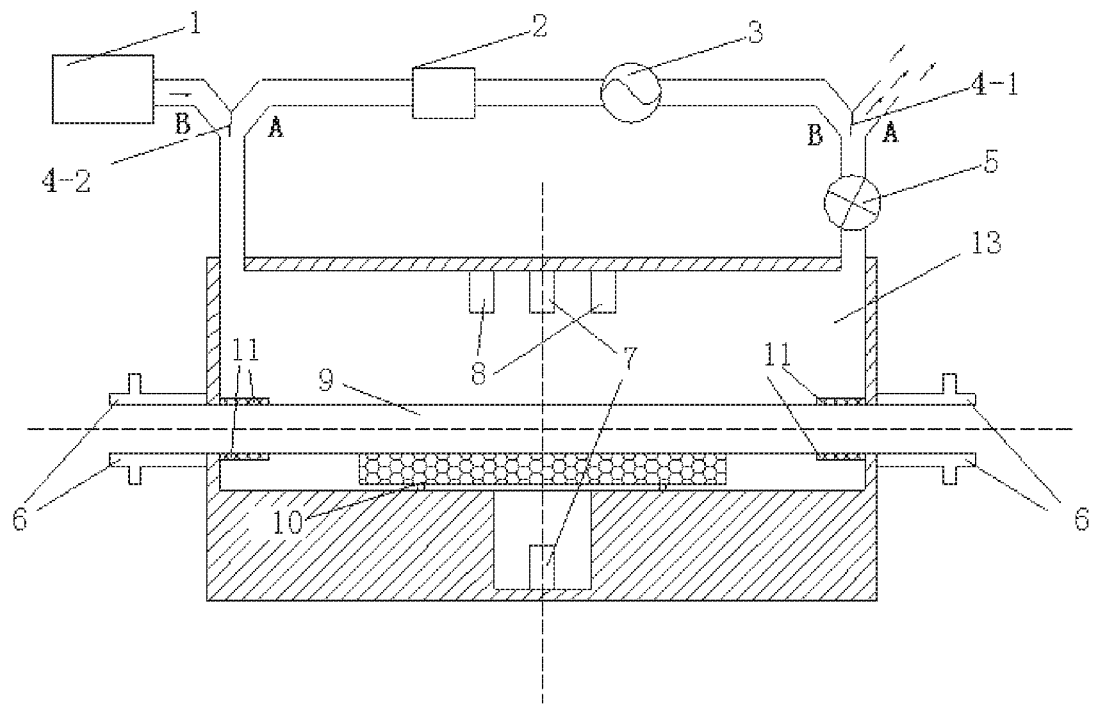
FIG. 1 is a schematic view showing the structure of the microwave-based thermal coupling chemical looping gasification device employing two sources according to the present invention.
Figure 2:
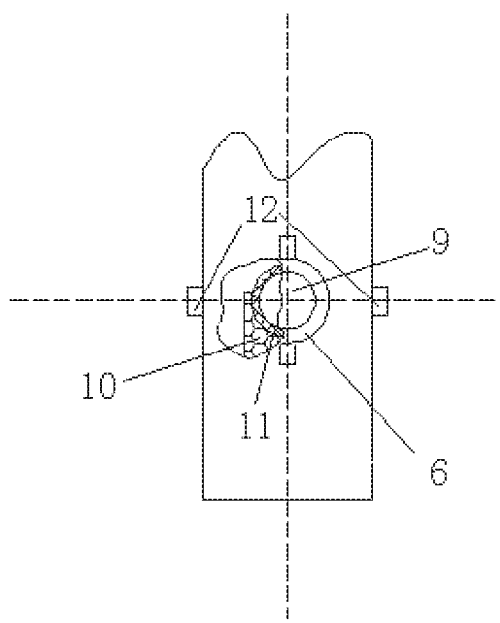
FIG. 2 is a partial cross-sectional view of FIG. 1.

As shown in FIGS. 1 and 2, the present invention discloses a microwave-based thermal coupling chemical looping gasification device employing two sources, which comprises the following components:

a microwave radiation cavity 13;

a loading recess 10 of a microwave absorbing material filled with the microwave absorbing material;

a quartz pipe reaction cavity 9 between the microwave radiation cavity 13 and the loading recess 10 of the microwave absorbing material; the quartz pipe reaction cavity 9 is driven to rotate by a motor 11; the motor 11 is covered around with a microwave shielding net;

a microwave generator consisting of magnetrons 7 is provided at a central portion of the microwave radiation cavity 13 and below the loading recess 10 of the microwave absorbing material at a corresponding location; an infrared temperature-measuring probe group 8 is arranged at two ends of the magnetrons 7;

two ends of the microwave radiation cavity 13 are connected to a first three-way valve 4-1 and a second three-way valve 4-2, respectively;

the first three-way valve 4-1 has a port A in communication with the ambient atmosphere; the second three-way valve 4-2 has a port B in communication with a protection gas (argon, nitrogen) charging device 1 for the microwave radiation cavity; the second three-way valve 4-2 has a port A in communication with a port B of the first three-way valve 4-1 via a pipeline; a protection gas cooling device 2 and a protection gas circulating fan 3 are sequentially connected in series on the pipeline; and a microwave suppressor 6 is disposed at each of the two ports of the quartz pipe reaction cavity 9.

The first three-way valve 4-1 is turned to the left, such that the microwave radiation cavity 13 is in communication with the ambient atmosphere.

The second three-way valve 4-2 is turned to the right, such that the protection gas charging device 1 for the microwave radiation cavity is in communication with the microwave radiation cavity 13 to get the microwave radiation cavity 13 charged.

The second three-way valve 4-2 is turned to the left, and the first three-way valve 4-1 is turned to the right, such that the microwave radiation cavity 13, the protection gas circulating fan 3 and the protection gas cooling device 2 form a closed loop.

A gas pressure and oxygen concentration detector 5 is disposed on the connecting pipeline between the first three-way valve 4-1 and the microwave radiation cavity 13.

The microwave radiation cavity 13 is also provided with a radiation cavity lock 12.

In the present invention, the microwave absorbing material absorbs microwave to raise the temperature, so that a stable high temperature is achieved in the middle of the reaction cavity.

Microwave radiation can be directly irradiated on the materials to achieve bulk heating, which is combined with the stable high temperature heating achieved by the microwave absorbing material to form a thermal coupling enhanced heating method employing two sources.

The motor drives the quartz pipe reaction cavity to rotate slowly during the entire reaction process.

Non-contact temperature measurement made with the infrared temperature-measuring probe group can avoid the influence of the temperature-measuring probe on the magnetic field.

The portion of the quartz pipe reaction cavity exposed to the environment is wrapped with a microwave suppressor, which uses circulating cooling water as the absorption medium.

During the reaction, the protection gas in the microwave radiation cavity is continuously circulated and cooled, and the pressure and the oxygen concentration are monitored by the gas pressure and oxygen concentration detector 5. When the pressure is too low or the oxygen concentration is too high, the protection gas charging device for the microwave radiation cavity is turned on to supplement the protection gas.

Compared with the conventional electric furnace heating, the thermal coupling chemical looping gasification device employing two sources not only contains the heating method similar to the conventional electric furnace (the conduction, convection and surface radiation of the microwave absorbing material), but also includes the microwave electromagnetic radiator heating, combining the advantages of conventional heating and microwave bulk heating, making the entire gasification process more stable, more efficient, faster and safer.

The microwave suppressor uses water as an absorption medium for leaked microwave, and uses a circulating cooling means to maintain the water temperature, which can efficiently absorb the leaked microwave and is safe and harmless.

The microwave radiation cavity is filled with an inert protection gas to prevent the microwave absorbing material from reacting with air under high temperature conditions, and provided with a circulation device to save gas. The infrared temperature-measuring probe group can be used to get the quartz pipe penetrated to realize temperature monitoring in a large temperature-measuring range from low temperature to high temperature.

The microwave suppressor 6 uses water as an absorption medium for leaked microwave, and uses a circulating cooling means to maintain the water temperature, which can efficiently absorb the leaked microwave and is safe and harmless. The protection gas of the microwave radiation cavity 13 is used to prevent the microwave absorbing material from reacting with air under high temperature conditions. Since the infrared transmission wavelength of quartz is 0.14-4.5 um, the large temperature-measuring range from low temperature to high temperature cannot be realized, and the infrared temperature-measuring probe group 8 (high temperature probe and low temperature probe) is needed. The microwave shielding net around the motor can intercept the leaked microwave, which is combined with a microwave suppressor to form a double-layer protection against microwave leakage.

A microwave-based thermal coupling chemical looping gasification method employing two sources comprises the following steps:

Step 1: materials are placed in the middle of the quartz pipe reaction cavity 9, and the left and right ends of the quartz pipe reaction cavity 9 are made in communication (no order) with an inert carrier gas and a product collection device, respectively; first the air in the quartz pipe reaction cavity 9 is removed by pre-purging, and then the carrier gas supply is maintained throughout the gasification process until the end of the reaction;

Step 2: the first three-way valve 4-1 is turned to the left to make the microwave radiation cavity 13 in communication with the ambient atmosphere, and meanwhile the second three-way valve 4-2 is turned to the right to make the microwave radiation cavity 13 in communication with the protection gas charging device 1 for the microwave radiation cavity; the microwave radiation cavity 13 is charged, and attention is paid to the oxygen level and the internal protection gas pressure displayed by the gas pressure and oxygen concentration detector 5; when the oxygen concentration is less than 0.1%, the second three-way valve 4-2 is turned to the left and the first three-way valve 4-1 is turned to the right, such that the microwave radiation cavity 13, the gas pressure and oxygen concentration detector 5, the protection gas circulating fan 3 and the protection gas cooling device 2 form a closed loop; the protection gas circulating fan 3 and the protection gas cooling device 2 are started to circulate the inert gas in the closed loop; it is necessary to maintain a positive pressure of the microwave radiation cavity 13 throughout the reaction process; if the gas pressure and oxygen concentration detector 5 shows that the pressure is less than 1 atm, the protection gas charging device 1 for the microwave radiation cavity is started in time to supplement the protection gas;

Step 3: the motor 11 is started to maintain the quartz pipe reaction cavity 9 in a slow rotation state; then the magnetron 7 is started, with its input power and frequency controlled through a computer; the surface temperature of the materials is monitored by an infrared temperature probe group 8, and the temperature data are collected and stored by a computer; the temperature in the loading recess 10 of the microwave absorbing material is monitored by a patch thermocouple, and the temperature data are also collected and stored by a computer;

at the end of the reaction, the magnetron 7 is turned off, the positive pressure of the microwave radiation cavity 13 is released, the radiation cavity lock 12 is opened, and the quartz pipe reaction cavity 9 is taken out for cleaning.

The present invention can be well implemented as described above.

The embodiments of the present invention are not limited to the above-described examples, and any other alterations, modifications, substitutions, combinations, and simplifications that are made without departing from the spirit and scope of the present invention should be equivalent and within the scope of protection of the present invention.

The invention claimed is:

1. A microwave-based thermal coupling chemical looping gasification device employing two sources, the device comprising the following components:
    a microwave radiation cavity;
    a loading recess of a microwave absorbing material filled with the microwave absorbing material;
    a quartz pipe reaction cavity between the microwave radiation cavity and the loading recess of the microwave absorbing material; the quartz pipe reaction cavity is driven to rotate by a motor;
    a first microwave generator consisting of a first magnetron, the first microwave generator is provided on a first outer side of the quartz pipe reaction cavity and located in the microwave radiation cavity;
    a second microwave generator consisting of a second magnetron, the second microwave generator is provided on a second outer side of the quartz pipe reaction cavity; and
    an infrared temperature-measuring probe group arranged at two ends of the first magnetron;
    wherein the loading recess is provided on the second outer side of the quartz pipe reaction cavity and located between the quartz pipe reaction cavity and the second microwave generator;
    two ends of the microwave radiation cavity are connected to a first three-way valve and a second three-way valve, respectively;
    the first three-way valve has a port A in communication with the ambient atmosphere; the second three-way valve has a port B in communication with a protection gas charging device for the microwave radiation cavity; the second three-way valve has a port A in communication with a port B of the first three-way valve via a pipeline; and a protection gas cooling device and a protection gas circulating fan are sequentially connected in series on the pipeline.

2. The microwave-based thermal coupling chemical looping gasification device employing two sources according to claim 1, wherein a microwave suppressor is disposed at each of the two ports of the quartz pipe reaction cavity;
    the first three-way valve is configured to turn to a first position of the first three-way valve, such that the microwave radiation cavity is in communication with the ambient atmosphere;
    the second three-way valve is configured to turn to a first position of the second three-way valve, such that the protection gas charging device for the microwave radiation cavity is in communication with the microwave radiation cavity to charge the microwave radiation cavity;
    the second three-way valve is configured to turn to a second position of the second three-way valve, and the first three-way valve is configured to turn to a second position of the first three-way valve, such that the microwave radiation cavity, the protection gas circulating fan, and the protection gas cooling device form a closed loop.

3. The microwave-based thermal coupling chemical looping gasification device employing two sources according to claim 2, wherein a detector is disposed on the connecting pipeline between the first three-way valve and the microwave radiation cavity, the detector being configured to detect a pressure of gas and a concentration of oxygen.

4. The microwave-based thermal coupling chemical looping gasification device employing two sources according to claim 3, wherein the microwave radiation cavity is also provided with a radiation cavity lock.

5. A microwave-based thermal coupling chemical looping gasification method employing the two sources, the method, implemented by using the microwave-based thermal coupling chemical looping gasification device employing the two sources according to claim 4, comprises the following steps:
    Step 1: materials are placed in the middle of the quartz pipe reaction cavity, and a first end and a second end of the quartz pipe reaction cavity are made in communication with an inert carrier gas and a product collection device, respectively; first the air in the quartz pipe reaction cavity is removed by pre-purging, and then the carrier gas supply is maintained throughout the gasification process until the end of the reaction;
    Step 2: the first three-way valve is turned to the first position to make the microwave radiation cavity in communication with the ambient atmosphere, and meanwhile the second three-way valve is turned to the first position to make the microwave radiation cavity in communication with the protection gas charging device for the microwave radiation cavity; the microwave radiation cavity is charged, and attention is paid to the oxygen level and the internal protection gas pressure displayed by the detector; when the oxygen concentration is less than 0.1%, the second three-way valve is turned to the second position and the first three-way valve is turned to the second position, such that the microwave radiation cavity, the detector, the protection gas circulating $fan_g$ and the protection gas cooling device form the closed loop; the protection gas circulating fan and the protection gas cooling device are started to circulate the inert gas in the closed loop; it is necessary to maintain a positive pressure of the microwave radiation cavity throughout the reaction process;

if the detector shows that the pressure is less than 1 atm, the protection gas charging device for the microwave radiation cavity is started to supplement the protection gas;

Step 3: the motor is started to maintain the quartz pipe reaction cavity in a slow rotation state; then the first magnetron and second magnetron are started, with input power and frequency of the first magnetron and second magnetron controlled through a computer; the surface temperature of the materials is monitored by the infrared temperature-measuring probe group, and the temperature data are collected and stored by the computer; the temperature in the loading recess of the microwave absorbing material is monitored by a patch thermocouple, and the temperature data are also collected and stored by the computer.

6. The microwave-based thermal coupling chemical looping gasification method employing the two sources according to claim 5, the method further comprising an end step:

at the end of the reaction, the first magnetron and second magnetron are turned off, the positive pressure of the microwave radiation cavity is released, the radiation cavity lock is opened, and the quartz pipe reaction cavity is taken out for cleaning.

* * * * *

UNITED STATES PATENT AND TRADEMARK OFFICE
CERTIFICATE OF CORRECTION

PATENT NO. : 11,504,691 B2
APPLICATION NO. : 16/613920
DATED : November 22, 2022
INVENTOR(S) : Yanfen Liao et al.

It is certified that error appears in the above-identified patent and that said Letters Patent is hereby corrected as shown below:

On the Title Page

Column 1, Item (73) Assignee, Line 1, after "Technology" insert -- , (CN) --

In the Claims

Column 8, Line 62, Claim 5, delete "$fan_g$" and insert -- fan, --

Signed and Sealed this
Twenty-eighth Day of February, 2023

Katherine Kelly Vidal
*Director of the United States Patent and Trademark Office*